United States Patent [19]
Hollmann et al.

[11] Patent Number: 5,880,664
[45] Date of Patent: Mar. 9, 1999

[54] HIGH-VOLTAGE HIGH-BREAKING-CAPACITY FUSE

[75] Inventors: Fritz Hollmann, Wegber; Martin Grote, Erkelenz; Ilona Kluth, Grevenbroich, all of Germany

[73] Assignee: Fritz Driescher KG Spezialfabrik für Elektrizit ätswerksbedarf GmbH & Co., Wegberg, Germany

[21] Appl. No.: 806,277

[22] Filed: Feb. 25, 1997

[30] Foreign Application Priority Data

Feb. 29, 1996 [DE] Germany .......... 196 07 756.7
Jan. 27, 1997 [DE] Germany .......... 197 02 780.6

[51] Int. Cl.⁶ .......... H01H 85/02; H01H 85/10; H02H 3/08
[52] U.S. Cl. .......... 337/159; 337/158; 337/150; 361/104
[58] Field of Search .......... 337/158–165, 337/168–181, 3–6, 229, 274, 292, 293, 148–151, 244, 267, 144, 154, 162, 401; 361/104, 103

[56] References Cited

U.S. PATENT DOCUMENTS

| | | |
|---|---|---|
| 3,839,786 | 10/1974 | Salzer . |
| 4,189,694 | 2/1980 | Blewitt .......... 337/158 |
| 5,463,366 | 10/1995 | Hassler et al. .......... 337/176 |

FOREIGN PATENT DOCUMENTS 1014206  8/1957  Germany .

*Primary Examiner*—Leo P. Picard
*Assistant Examiner*—Anatoly Vortman
*Attorney, Agent, or Firm*—Anderson, Kill & Olick, P.C.

[57] ABSTRACT

A quick-break fuse including at least one fuse link formed as a fusible element, a mechanical actuator operatively connected with the fuse link for disconnecting the same, an energy accumulator for actuating the mechanical actuator, a tripping wire for actuating the energy accumulator and which melts through as a result of transfer of current thereto caused by a voltage drop at a first melting within the fuse link-forming fusible element, and a meltable element connected with the energy accumulator for actuating the same upon being melted by heat generated in response to an excessive current which flows therethrough.

52 Claims, 5 Drawing Sheets

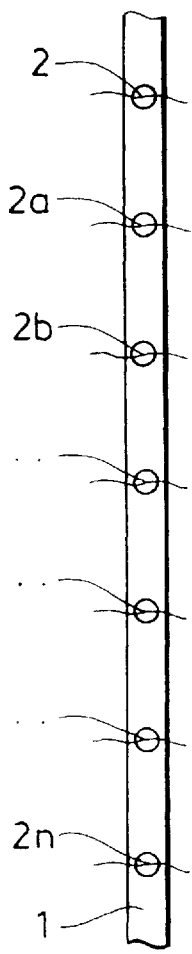
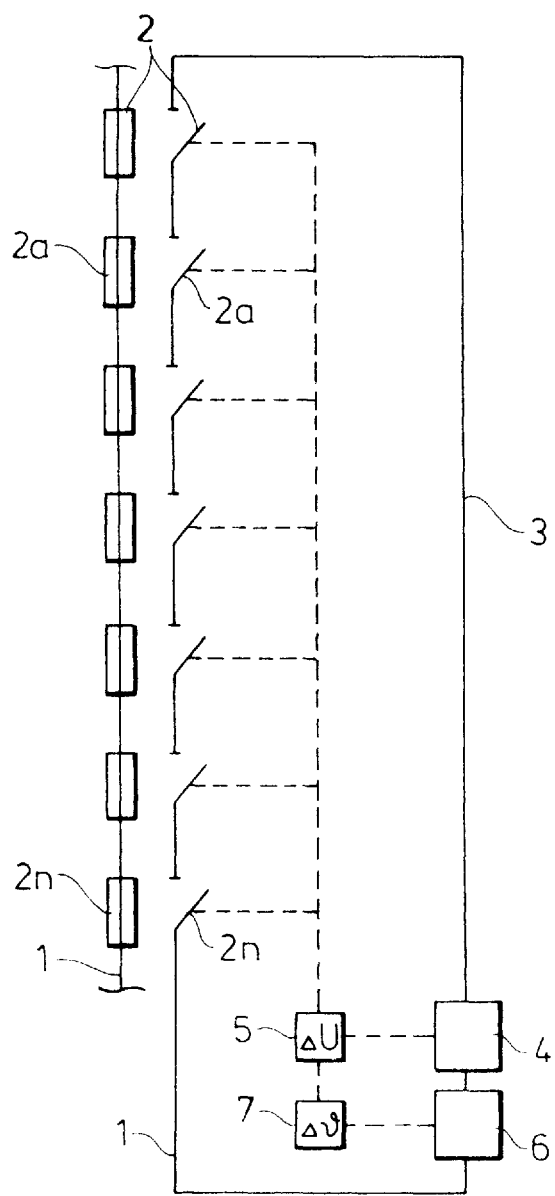

HIGH-VOLTAGE HIGH-BREAKING-CAPACITY FUSE

BACKGROUND OF THE INVENTION

1. Field of the Invention

The invention relates to a fuse, and more particularly to a quick-break fuse having at least one fuse link. Such fuses are used, preferably in the medium-voltage range, although in AN everyday language, they are called high-voltage or high-voltage quick-break fuses.

2. Description of the Prior Art

A fuse is a device which, by melting of one or more of its parts intended and designed for this purpose, opens the circuit, in which it is inserted, by interrupting the current if the current exceeds a predetermined value for a sufficiently long period of time. The fusible element or fuse link is intended to melt away under the influence of a current which exceeds a particular value for a particular length of time.

High-voltage quick-break fuses, as a rule, consist of a tubular ceramic body with conductive caps at both ends, between which, in the interior of the tube, fusible elements which are electrically connected to the caps are fixed on a ceramic insulting body. The whole fusible element structure is embedded in a bed of silica sand which serves to cool the arc, whereby a quick-break capacity of the fuses is obtained.

The fuse links concerned here are fuse links acting in a current-limiting and selective manner which are automatically tripped by the melting of a material to protect equipment, preferably, in medium-voltage networks of power supply plants and industry.

The brochure "High-voltage quick-break fuse links for indoor and outdoor switch bear" of the applicants' assignee discloses such fuses operating on the principle described above, wherein fusible elements arranged parallel to one another are placed in grooved webs of a star-shaped fusible element carrier and are thereby fixed exactly in position. This form of construction leads to quick-break capacity, since through this kind of arrangement of the fusible elements and the distinctive shape of the grooved webs of the star-shaped fusible element carrier, a system of series-connected chambers is formed. Upon interruption of short-circuits, a partial arc is formed in each of these chambers, which is precisely controlled by constrictions in the fusible element so that on evaporation of the fusible element a multiple disconnection occurs.

However, the disadvantage of the known fuse consists in that for physical reasons, it cannot interrupt a current below the minimum cut-off current. This is due to long melting times in the case of small excess currents and the accompanying excessive heating up.

A distinction is, therefore, made between sub-range and full-range fuses. The latter are capable of interrupting any current up to the rated cut-off current. Fuses of this kind are known, for example, from German patent documents 24 12 688 B2 and 32 37 326 A1, which propose to fit two electrically series-connected systems in one fuse link, with one of the systems corresponding to the current-limiting sub-range fuse, while a second system, which comprises fusible elements of tin housed in heat-resistant silicone tubes serves to interrupt the excess current. In case of an overload, the tin melts and flows under pressure out of the tubes into the silica sand, so that a breaking gap results.

In order to achieve complete overload protection in the case of sub-range fuses, these fuses are very often fitted in combination with an instantaneous fuse striker. In this case, a retaining wire located within the fuse releases the striker pin in case of overloads and effects a three-phase cut-off by way of the switch disconnector which follows. This construction is however regarded by many users as a technically and economically unsatisfactory solution of the problem, since with the three-phase cut-off, the network supply cannot be further maintained through the switch load-break which is also required, and the construction of the tripping mechanism is relatively complicated.

It is preferred to use full-range fuses, which eliminate the above-mentioned disadvantages since the cutting-off of the overload and short-circuit currents is undertaken directly by the fuse link. The known form of construction described above comprises connection in series of two switching systems which operate on different principles, and the characteristic curve therefore results from the superposition of the characteristics of the two switching systems.

It has now been found that cut-offs at the point of the intersection of the two characteristic curves, i.e., in the transition region between short-circuit and overload regions, cannot always be reliably controlled. Switching failures can occur in the vicinity of the point of intersection of the two characteristic curves if the current is too large for the quenching system but is too low for the silver fusible element. Since the overall lengths of the high-voltage quick-break fuses are prescribed by a standard, the two switching systems are divided in the full-range fuses so that about one-third is provided for the overload region and two-third for the short-circuit region.

Because of the smaller space available, the switching capacity of the switching system responsible for the short-circuit currents is reduced, and the minimum cut-off current is likewise substantially higher. This means in addition that the dielectric strength after successful cut-off has to be achieved on a shorter region of the fuse. This is serious, since it can result in restriking.

In addition, full range fuses of this construction cannot be built in all sizes. Thus for technical reasons these fuses cannot be realized for the small 20 kV fuse range.

A quick-break fuse having at least one fuse-link (the fusible element) and means for mechanically opening the fuse-link or links by means of a mechanical actuator connected to an energy accumulator and having a tripping wire is in fact known from U.S. Pat. No. 4 189 694. In this fuse, however, the tripping wire serves to supply a movement initiator with current in the event of a fault. This wire must thus in no circumstances be broken. Moreover, this fuse is not suitable for the low excess current region, since it does not react to the heating up that occurs as a result of the excess currents, but at best only when the first arc is formed.

Accordingly, an object of the invention is providing, in place of the known full-range fuse, a general-purpose fuse which is capable of interrupting any current, up to the rated cut-off current, in a reliable and detectable manner. Another object is to achieve, without restriction of the response characteristics in the short-circuit region, all the dimensions possible according to the standard, and moreover, to avoid combinations with switching devices in order to achieve an economical and inexpensive design.

SUMMARY OF THE INVENTION

On the basis of the underlying concept of a combination, namely of enabling the destruction or disconnection of the fusible element or elements both in the liquid and in the solid phase thereof, the invention provides a quick-break fuse having at least one fuse link (fusible element) and means for mechanically opening the fuse link or links with a mechanical actuator connected to an energy accumulator and in which an electrical triggering of the disconnection in the medium-voltage range takes place when a tripping wire, which is connected with the energy accumulator melts through due to voltage drop at the first melting arc within the fusible element and the resulting transfer of current to the tripping wire and thereby actuates the energy accumulator, and a thermal triggering provides for actuation of the energy accumulator in the lower-voltage range due to the generation of heat which occurs with a small excess current. The tripping wire can, for example, be formed as a resistance wire connected in parallel to the fusible element or elements which can be provided with a plurality of seriesly by connected constrictions. Thus, by simple additional means a mechanical disconnection of the fusible element, basically at constrictions formed, for example, by stamping out, is effected. Thus, it is possible to accommodate the fuse link in a tubular body with the aforementioned dimensional advantages.

The invention consequently provides a general-purpose fuse which is only occasionally actuated by a fusion effect, so that the terms "fuse" and "fuse wire" here only apply to a limited extent, since by simple means, the cutting off of the overload current is not restricted to the fusion or "blowing" principle but in addition, an intentionally effected mechanical disconnection of the same fuse wire is initiated.

In the fuse in accordance with the invention, while adopting the construction and hence the known advantages of the sub-range fuse for switching the currents in the overload region, at least some of the seriesly by connected constrictions (notices or holes) of the fusible element are mechanically triggered in parallel and simultaneously when the arc voltage occurs.

As a further advantage, it should be mentioned that the difficulties in the transition region between short-circuit and overload regions referred to in the introduction can be eliminated by the invention, since there are no longer any spatial limitations, and by suitable choice of solder and monitor, an optimum adaptation to the respective requirements is possible.

The triggering of the disconnection of the fusible element is preferably effected with a mechanical actuator which is connected to a preloaded energy accumulator which is triggered thermally, or electrically by an additional thin resistance wire which melts through due to the voltage drop at the first arc to occur within the fuse wire (fusible element).

A further particular advantage of the solution in accordance with the invention consists in that the fusible element or the fusible elements arranged parallel to one another perform a double function, that is to say, in the short-circuit region, the Joule heat, which is no longer adequately conducted away, leads to melting through of the resistance wire, and in the minimum cut-off current region up to the rated current of the fuse, to mechanical opening or tearing apart of a silver wire.

According to this principle, a kind of cascade switching is produced in the event of overload, with successive constrictions in the fusible element being opened, and open breaking gaps corresponding to the number of constrictions being formed.

By the arrangement in accordance with the invention, it is possible to produce, in a surprising and unexpected manner, orderly and reproducible cut-off results in the transition region of the minimum cut-off current. For the general-purpose fuse in accordance with the invention, it is possible, as already mentioned, to keep to the overall lengths in accordance with the standard, advantageously without subdividing the switching system. In other words, the construction of the ceramic insulating body with the fuse wires wound on it can still be used. Thereby, for example, the small overall sizes according to the standard can also be used with the arrangement now proposed.

Hence in the supply network, the conventional quick-break fuses can be replaced without great expense by this new general-purpose fuse. In networks, sub-range fuses are often used as the sole protection. Low earth leakage currents, which can occur over prolonged periods, lead inter alia to faults or damage to the sub-range fuse links. Instead of the expensive conversion to fuse/circuit-breaker combinations in these cases, the general-purpose fuses now proposed can ideally be used.

A preferred field of application for the invention which comes into consideration is the high-voltage-side protection of distribution transformers under both indoor and outdoor conditions.

Many embodiments of the invention are possible. Thus, in the case of quick-break fuses with a striker pin or an indicator device, a retaining wire arranged within the fuse can release a preloaded spring and actuate the striker pin. The present invention proposes, for example, to adopt the principle of using a retaining wire and a preloaded spring to release a mechanical actuator. The retaining wire can be wound parallel to the fuse wire or passed through the internal passage in the star-shaped body. The spring energy accumulator may be located, like the striker pin device, at the end of the star-shaped body.

The severing of the fusible element can take place by tension or shearing. For this purpose, it is preferable to combine constrictions which lie geometrically one after another with a rod, preferably a torsion rod, which produces a tensile force at the weakened cross-sections by rotation. The torsion rod can, e.g., be arranged on the star-shaped body in place of a web, or arranged between two webs, or guided in the axis of the star-shaped body.

The mechanical connection with the fusible elements can take place by separation of the torsion rod, but it is simpler to form the torsion rod in two parts. In place of the retaining wire the spring energy accumulator can be connected using a selective solder joint whose melting point is adapted to the rated current of the fuse. Installation of this solder joint achieves the result that on warming-up of the fuse to a temperature that is not yet critical for the fuse housing, the preloaded spring is released by liquefaction of the solder and tears apart the fuse wire, optionally, by a diversion of the forces.

Instead of the solder joint, which may, for example, consist of an eutectic alloy, it is also possible to effect the thermal actuation and the displacement of the rod, e.g., by a bimetallic or shape memory element, in which case the spring accumulator unit referred to could optionally be dispensed with.

In embodiments of the invention, the functional and spatial relationships of the components can be optimized without requiring an additional space.

The structure and dimensions of fuses of this type are determined by the standard, with contact caps of specified dimensions at the ends being provided. The interiors of these contact caps are sealed against the fuse proper by a foil covering, in order to prevent the escape of the silica sand present in the fuse.

The invention makes use of this cap cavity and proposes in a preferred embodiment, to locate the energy accumulator in at least one of the contact caps of the fuse. In the interest of a space-saving simplification of the design and of the course of the movement, the actuator preferably takes the form of a pull- and/or push-rod movable in the direction of its longitudinal axis, and a blocking mechanism is accommodated in at least one of the contact caps of the fuse which holds the rod, in the normal condition of the fuse, in a position which prevents the opening of the fuse link or links. Preferably, the rod is cylindrical and is equipped with slits through which the would fusible element or elements is or are passed, so that in the corresponding operating condition on activation of the actuator, mechanical severing of the fusible element results from its sudden longitudinal movement. In order to cause the longitudinal movement of the rod at the desired point in time, it is actuated by the energy accumulator the preloading of which is countered in the normal operating condition of the fuse by the blocking mechanism. The blocking mechanism preferably comprises a lever linkage held in a blocking position (operating position) by a retaining wire. This concept leads to a reliable control lock construction, since it consists of only a few parts for which clear and easily assessable force and movement conditions hold.

Moreover, this concept permits a further optimization, by using the cavities which are present anyway. Thus, in an alternative embodiment of the invention, both the energy accumulator and the blocking mechanism are accommodated in the same contact cap.

The retaining wire referred to performs the function of the transfer member for the two combined modes of triggering (electrical or thermal), and to this end, combines the two tripping elements with one another. At the same time, it holds the control lock, in particular the lever linkage provided for this, in the operating position in which the rod is prevented form opening the fusible elements, i.e., is likewise held in the operating position.

For the electrical triggering, resistance wire is suitable, while for the thermal triggering, inter alia a selective solder can be considered. The retaining wire is, in this case, preferably connected at one end to the selective solder joint while the other end of the retaining wire is connected to the resistance wire and itself holds the blocking mechanism in the operating position in a suitable manner which will be described below by way of example. When one of the two grounds for triggering arises, interruption of the connection provided by the retaining wire takes place, which actuates the control lock or the blocking mechanism, whereby the rod (actuator) coupled with the blocking mechanism suddenly moves in the axial direction and thereby effects the breaking through of the fuse link.

BRIEF DESCRIPTION OF THE DRAWINGS

Further features and advantages of the invention will be described below in more detail with reference to the description of some preferred exemplary embodiments illustrated in the accompanying drawings, in which:

FIG. 1 shows a part of a fuse wire or fusible element in one possible embodiment using the fuse in accordance with the invention:

FIG. 2 shows extracts from a circuit diagram for the fuse;

DETAILED DESCRIPTION OF PREFERRED EMBODIMENTS OF THE INVENTION

Figure 3:
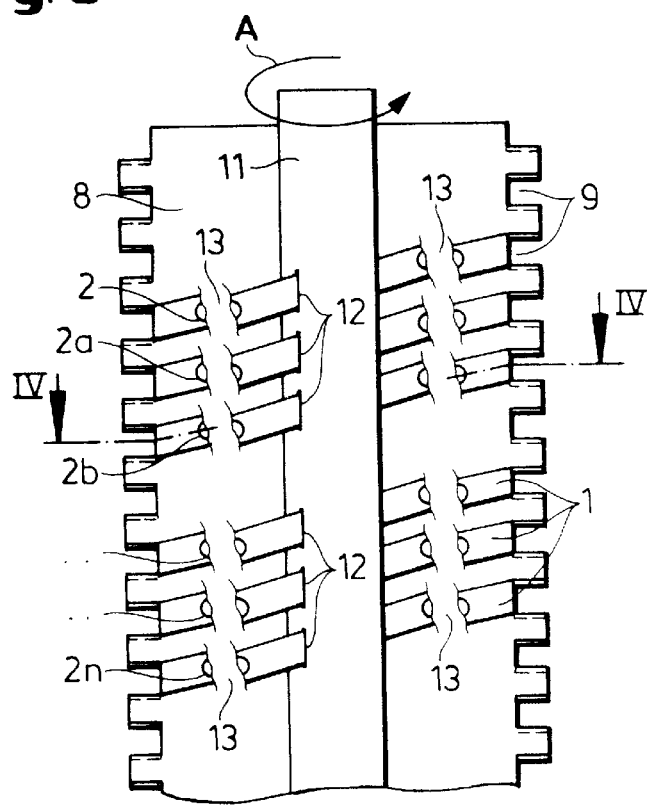
FIG. 3 shows diagrammatically the structure of part of a fuse-link.

Referring first to FIG. 1, a fusible element 1 is provided with a plurality of constructions 2, 2a, 2b . . . 2n, which in the example shown are formed as holes and constitute designed rupture points which lie electrically in series. Instead of the holes, notches can also be provided.

FIG. 2 shows diagrammatically the basic circuit arrangement using as an example only one fusible element 1 (as the following embodiments show, in practice, several fusible elements 1 are wound electrically in parallel). here, the constrictions 2, 2a . . . 2n are represented for the "fusion case" symbolically as fuses, while they are reproduced alongside on the right for the "mechanical opening case" as open switches.

The series-connected constrictions are simultaneously severed by a force after a critical temperature has been reached or after a predetermined voltage across a retaining wire has been reached. As alternatives or at the same time the circuit may include an electrical monitor 4 (sensor—indicator wire—) having attached to it a trip element 5 having a spring energy accumulator and/or a monitor 6 (sensor— selective solder joint or thermal monitor—) which likewise can be attached to a trip element 7 having a spring energy accumulator, which are connected through an indicator wire 3 (resistance wire) which already melts at the lower voltage which results from blowing of part of the length.

Figure 4:
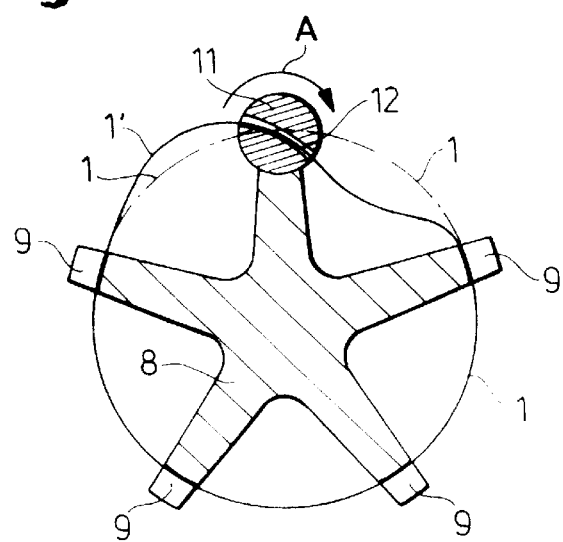
FIG. 4 shows a section along the line IV—VI in FIG. 3.

It can be seen from the diagrammatic side view in FIG. 3 that three strip-shaped fusible elements 1, connected electrically in parallel, are wound substantially in the form of a spiral on a star-shaped body 8 of insulating material, the cross-sectional shape of which can be seen from FIG. 4, the fusible elements being placed in grooves 9 machined in the webs of the star-shaped body 8 to fix them in their spaced relative positions.

FIG. 4 shows that in the vicinity of the end of one of the webs of the star-shaped body 8, there is provided a rotatable rod 11 the axis of rotation of which extends parallel to the longitudinal axis of the star-shaped body 8 and which is provided with through-slits 12 which extend transverse to the longitudinal axis and through which the fusible elements 1 are passed in each turn so as to lie one behind the other in the direction of the axis of rotation of the rod.

In FIG. 4, the fusible elements 1 are represented in their normal position by dash-dot lines, while the continuous line 1' shows the approximate course of the fusible element 1 which results when, after a corresponding actuation of the rod 11, as it was previously explained in detail, the rod 11 rotates in a direction shown by the arrow A. The fusible elements 1 are then bulged into the deformed position shown and are consequently subjected to mechanical tensile stress until they tear apart at the constrictions, as is shown in FIG. 3 by the gaps 13. This also corresponds to the condition shown in FIG. 2.

The process of triggering of the rotary movement of the rod 11 has been described in detail above, so that it does not require any further explanation here. It should only be mentioned that the opening at the constrictions can not only be effected by tensile forces, but also by shearing forces. With regard to this, some particularly preferred exemplary embodiments will now be described with reference to FIGS. 5 to 7.

Figure 5:
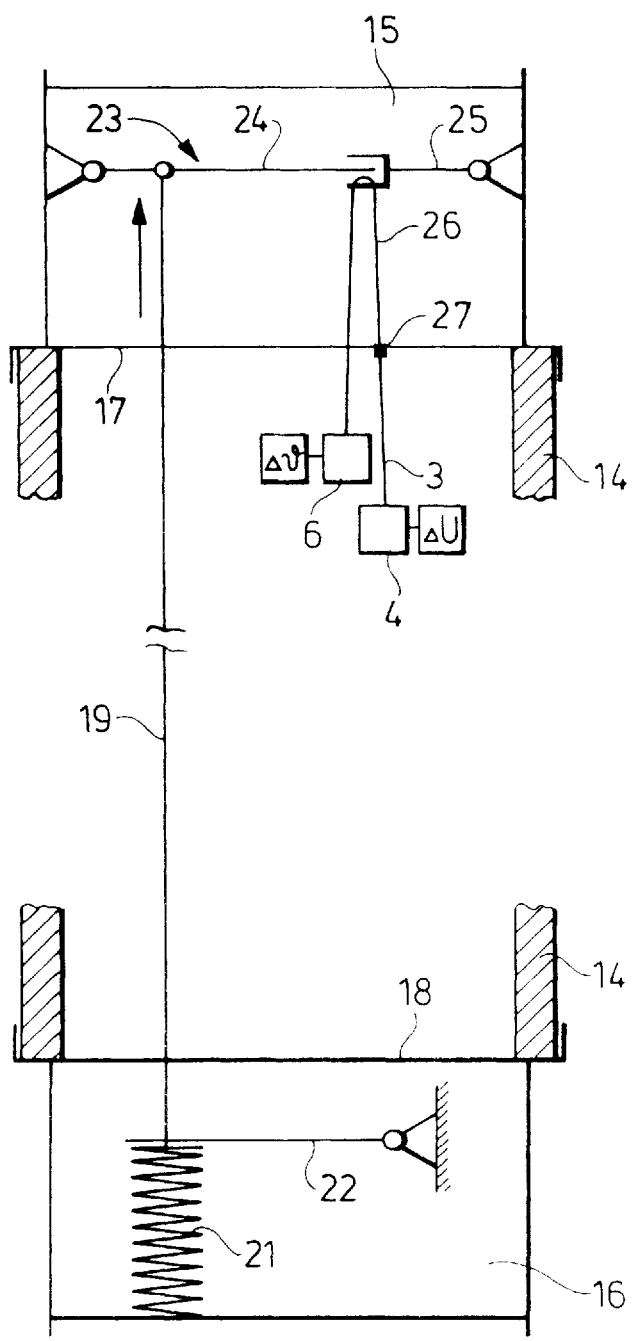
FIG. 5 shows in diagrammatic side view a fuse having a control lock and an energy accumulator accommodated in the contact caps.

A first embodiment of this further group of general-purpose fuses equipped in accordance with the invention with a pull-and/or push-rod as a shearing member is illustrated in [FIG. 5.] it is interrupted in its middle region, and has basically a conventional structure. It accordingly consists of a cylindrical fuse body 14 filled with silica sand and which is provided at each of its ends with a contact cap 15 and 16. A foil covering 17, 18 is provided at each end in the respective cap which prevents escape of the silica sand.

To simplify the representation, the fusible elements or fuse wires which are embedded in the silica sand and, as a rule, are wound on a ceramic insulating body, are not shown. Parts equivalent to the parts of the embodiment previously described are referred to below with the same reference signs.

According to the invention, this fuse, too, is provided both with a thermal monitor 6 and with an electrical monitor 4. Here, too, the thermal monitor 6 can be in the form of a selective solder joint, while the main functional element of the electrical monitor 4 is formed by the resistance wire 3.

The actuator effecting the mechanical opening of the fusible elements is here in the form of a pull- or push-rod 19, which, when actuated, is suddenly moved in the direction of its longitudinal axis as shown by the arrow and, in so doing, severs the fusible element which is, for example, passed through its slits. For this purpose, the rod 19 is mechanically preloaded by the energy accumulator, consisting in the present embodiment of at least one compression spring 21 which engages the lower end of the rod 19 with a pivotally mounted mounting plate 22 to which the lower end of the rod 19 is linked. As FIG. 5 shows, the energy accumulator accommodated in the cap cavity which is in any case present in such fuses. It is only necessary to provide a sand-tight passage through the foil covering 18 for the rod 19.

The blocking mechanism holding the rod 19 against the preload of the compression spring 21 in its ineffective position, i.e., in the operating position, is accommodated as a control lock 23 in the other contact cap 15 and consists essentially of a lever linkage, namely a longer lever 24 and a shorter lever 25, which are hingedly mounted opposite one another with one end on the wall of the cap, while their free ends are mechanically linked.

At a distance from the end of the lever 24 mounted on the cap wall, which is relatively short compared with the remainder of the length of the lever 24, the upper end of the rod 19 engages the lever 24, while the shorter lever 25 applies a downwardly directed retaining force to counteract the upwardly directed force acting on the lever 24, so that during operation the control lock 23 is in the position shown in FIG. 5. In order to apply the counter-force to the lever 25 in such a way that on occurrence of a fault (irrespective of whether it is caused thermally or electrically), it is removed so as to release the rod 19 to open the fuse. The thermal monitor or the selective solder joint 6 provided for that purpose is connected to a retaining wire 26 which is placed around the free end of the short lever 25 and is connected by its other end to the resistance wire 3 at the position 27, for example by a knot. In the present embodiment, the retaining wire 26 is about 0.2 mm thick and the resistance wire 3 about 0.25 mm thick.

In order that whenever a fault occurs, irrespective of whether it is of one or the other kind, the retaining wire 26 should release the shorter lever 25 so that the lever 24 can move upwards. The retaining wire 26 is placed over the end of the lever 25, for example, by providing an indentation, or an eye, or a round turn. If now, for example, the selective solder joint 6 melts under the influence of heat evolved in the case of small excess currents, the retaining wire 26 is released from the solder joint 6 and sets the lever 25 free. The same happens in the case of an electrical triggering, i.e., in the event that, due to a voltage drop at the first fusion arc to occur within the fusible element, a transfer of current to the resistance wire 3 takes place which causes this wire to melt through then, because of the knot 27, the retaining wire 26 will again yield or slip out of its looped-around position under the influence of the preloading force of the compression spring 21, acting on the lever 25, via the lever 24.

Corresponding to the sand-tight passage through the foil 18 mentioned for the lower cap 16, sand-tight passages are provided in the foil covering 17 both for the rod 19 and for the two bight ends of the retaining wire 26 which ensure both a reliable movement of the rod and also the smooth running through of the retaining wire in the case of any fault. In this connection, it should be emphasized that the knot 27 is merely shown emphasized for clarity, without meaning that it forms a stop or the like at the foil covering 17 or that it at all hinders the free movement of the wire in the event of triggering.

The lever arrangement described above and illustrated in FIG. 5 makes it clear that, together with the shorter lever 25, the longer lever 24 resists the preloading force so as to give a mechanical advantage, the shorter lever 25 being held by the retaining wire 26 in a position blocking the upward movement of the longer lever 24.

Figure 6:
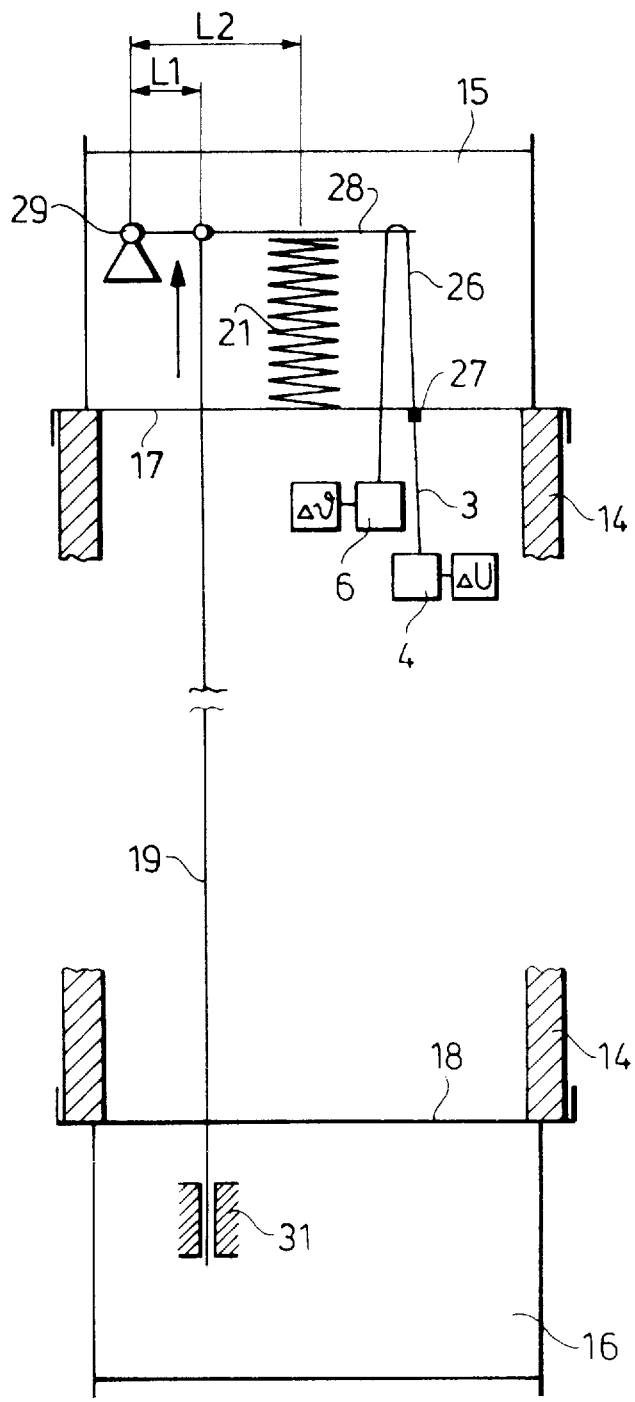
FIG. 6 shows a view similar to that of FIG. 5 in which the control lock and the energy store are accommodated in one and the same contact cap.
Figure 7A:
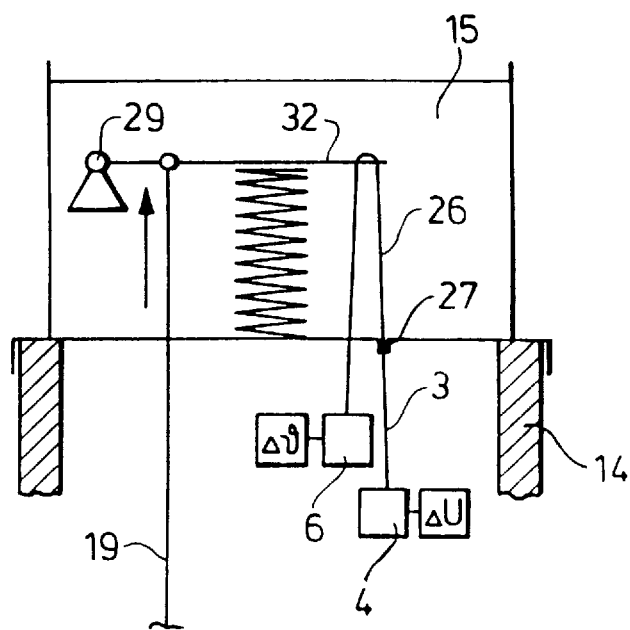
FIG. 7A shows an embodiment as shown in FIG. 6 having two compression springs connected in parallel as energy accumulator.

FIG. 6 shows a further possible embodiment which accommodates the control lock and the energy accumulator in a particularly space-saving manner in only a single cap 15. In the following description, the parts which correspond to those in FIG. 5 are referred to with the same reference signs.

The important difference of the embodiment shown in FIG. 6 from that of FIG. 5 consists is that instead of two levers, the control lock now only requires one lever 28, which is pivotally mounted at 29 at one end. The lever 28 is engaged, at its free end, by the retaining wire 26, which is the manner described in the connection with FIG. 5 connects the resistance wire 3 and the solder joint 6 tog ether and holds the lever 28 in the operating position against the preloading force imparted by the compression spring 21, which likewise engages the lever 28 from below. Finally, the rod 19 also engages the lever 28, specifically at a smaller distance L1 from the pivot bearing 29 than the compression spring 21, so that there is a mechanical advantage L2:L1, with the consequence that through the longer lever arm L2, a transfer of force from the spring 21, sufficient to guarantee reliable opening of the fusible element, is achieved in the event of triggering. On the other hand, the still longer lever arm for the point of engagement of the retaining wire 26 compared with the spring lever arm guarantees that the retaining wire can perform the necessary blocking function.

In this embodiment as well, in which the spring 21 engages directly the lever 28, in the event of actuation, the movement of the rod 19 takes place in the same direction as in the embodiment shown in FIG. 5, as is also shown by the arrow. The rod 19 is held at its lower end in a guide 31 accommodated in the cap 16.

Figure 7B:
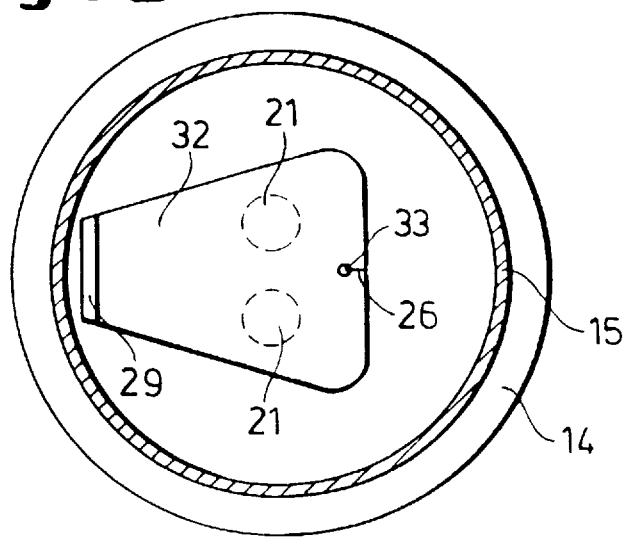
FIG. 7B shows a plan view of the force transfer member.

Finally, FIG. 7A again shows the upper contact cap 15 with the preloaded control lock. The FIG. 7B shows a preferred lever arrangement, namely in the form of a mounting plate 32, which makes it possible for two springs 21 to be used as the energy accumulator. At the end opposite the pivot bearing 29, the mounting plate 32 has a bore 33 through which the retaining wire 26 is passed.

What is claimed is:

1. A quick-break fuse for use in a medium-voltage range and a low-voltage range, comprising:
    at least one fuse link formed as a fusible element;
    mechanically operating means for disconnecting the fuse link and including a mechanical actuator operatively connected with the fuse link for disconnecting the same, and an energy accumulator for actuating the mechanical actuator;
    electrically operating means for disconnecting the fuse link in the medium-voltage range and including a tripping wire for actuating the energy accumulator upon being melted through, the tripping wire melting through as a result of transfer of current thereto caused by a voltage drop at a first melting are within the fuse link-forming fusible element; and
    thermally operating means for disconnecting the at least one fuse link in the low-voltage range and including a meltable element connected with the energy accumulator for actuating the same upon being melted by heat generated in response to an excess current which flows therethrough, wherein the tripping wire is formed as a resistance-indicator wire connected substantially in parallel with the fusible element.

2. A fuse as claimed in claim 1, wherein the fusible element is provided with a plurality of seriesly connected constriction.

3. A fuse as claimed in claim 1, wherein the fusible element is wound on an insulating member.

4. A fuse as claimed in claim 3, wherein the insulating member has a form of a star-shaped carrier for the fusible element and is provided with grooved webs.

5. A fuse as claimed in claim 4, comprising a plurality of fusible elements wound in parallel and lying in the grooves.

6. A fuse as claimed in claim 1, wherein the fusible element is embedded in silica sand.

7. A fuse as claimed in claim 2, wherein the constrictions are formed as holes.

8. A fuse as claimed in claim 2, wherein the constrictions are formed as notches.

9. A fuse as claimed in claim 2, wherein disconnection of the fusible element takes place in parallel and simultaneously at at least some of the constrictions.

10. A fuse as claimed in claim 1, wherein the energy accumulator comprises a preloaded spring, and the meltable element comprises a retaining wire which releases the preloaded spring for actuating the mechanical actuator.

11. A fuse as claimed in claim 10, wherein the retaining wire is formed as one of a resistance wire and an indicator wires.

12. A fuse as claimed in claim 10, wherein the retaining wire is wound parallel to the fusible element.

13. A fuse as claimed in claim 10, wherein the retaining wire runs through an internal channel in a star-shaped fusible element carrier.

14. A fuse as claimed in 1, wherein the energy accumulator is located at an end of a star-shaped fusible element carrier.

15. A fuse as claimed in claim 1, wherein the energy accumulator comprises a spring.

16. A fuse as claimed in claim 14, wherein the mechanical actuator is formed as a rod extending substantially parallel to the webs of the star-shaped fusible element carrier which engages with points on the at least one fusible element which are substantially aligned along a length of the fusible element carrier.

17. A fuse as claimed in claim 16, wherein the rod is formed a shearing rod.

18. A fuse as claimed in claim 16, wherein the rod is formed a torsion rod.

19. A fuse as claimed in claim 16, wherein the rod is one of mounted on a web and replacing a web of the star-shaped fusible element carrier.

20. A fuse as claimed in claim 16, wherein the rod is mounted between two webs of the star-shaped fusible element carrier.

21. A fuse as claimed claim 16, wherein the rod is mounted in an axis of the star-shaped fusible element carrier.

22. A fuse as claimed in claim 18, wherein the torsion rod has one of holes and slits (11) through which the at least one wound fusible element extends.

23. A fuse as claimed in claim 18, wherein the torsion rod is formed as a longitudinally divided torsion rod which receives aligned points of the at least one fusible element between its parts.

24. A fuse as claimed in claim 1, wherein the melting element is formed as a selective solder joint.

25. A fuse as claimed in claim 24, wherein the solder joint consists of an eutectic alloy.

26. A fuse as claimed in claim 1, wherein the fuse has opposite contact caps, and the energy accumulator is located in at least one of the contact caps.

27. A fuse as claimed in claim 26, further comprising a blocking mechanism located in at least one of the contact caps.

28. A fuse as claimed in claim 26, wherein the mechanical actuator comprises at least one of a pull rod and a push rod.

29. A fuse as claimed in any one of claim 26, wherein the mechanical actuator comprises a cylindrical rod.

30. A fuse as claimed in claim 28, wherein the at least one of the pull rod and the push rod has slits through which the at least one fusible element extends.

31. A fuse as claimed in claim 29, wherein the cylindrical rod has slits through which the at least one fusible element extends.

32. A fuse as claimed in claim 1, wherein the mechanical actuator comprises a rod directed parallel to a longitudinal axis of the fuse.

33. A fuse as claimed in claim 1, wherein the mechanical actuator comprises a rod acted on, directly or indirectly by the energy accumulator.

34. A fuse as claimed in claim 27, wherein the blocking mechanism comprises a lever linkage which is held in a blocking position by a retaining wire.

35. A fuse as claimed in claim 34, wherein the retaining wire is connected at one end to the tripping wire and at its opposite end to the meltable element which is formed as a selective solder joint.

36. A fuse as claimed in claim 34 wherein the mechanical actuator comprises a rod which cooperates with the lever linkage.

37. A fuse as claim in claim 34, wherein the retaining wire holds the lever linkage in a working position against a prestress of the energy accumulator.

38. A fuse as claimed in claim 1, wherein the energy accumulator comprises at least one compression spring.

39. A fuse as claimed in claim 34, wherein the lever linkage comprises two levers which are pivotally mounted at respective one ends thereof and which have opposite ends thereof connected with each other.

40. A fuse as claimed in claim 39, wherein the levers are of unequal lengths.

41. A fuse as claimed in claim 39, wherein the energy accumulator comprises a rod ( which engages a longer lever and the retaining wire engages a shorter lever.

42. A fuse as claimed in claim 41, wherein the rod engages the longer lever nearer to a mounting end thereof than to a free end thereof, and the retaining wire engages free end of the shorter lever.

43. A fuse as claimed in claim 27, wherein the mechanical actuator comprises a rod having one of its opposite ends connected to the blocking mechanism, and another of its opposite ends connected to a pivotally mounted mounting plate acted upon by the energy accumulator.

44. A fuse as claimed in claim 43, wherein the energy accumulator and the mounting plate are accommodated in one of the contact caps and the blocking mechanism is accommodated in another of the contact caps.

45. A fuse as claimed in claim 43, wherein the energy accumulator and the blocking mechanism are accommodated in the same contact cap.

46. A fuse as claimed in claim 45, wherein the blocking mechanism has only one lever pivotally mounted at one end thereof.

47. A fuse as claimed in claim 46, wherein a retaining wire engages a free end of the lever for holding the lever in a blocking position.

48. A fuse as claimed in claim 47, wherein the energy accumulator engages the lever between the retaining wire and the rod linked to the lever.

49. A fuse as claimed in claim 48, wherein the lever is formed as a mounting plate.

50. A fuse as claimed in claim 34, wherein at least some of pivotable parts of the linkage are mounted on a wall of the cap.

51. A fuse as claimed in claim 34, wherein the retaining wire is looped around an end of a lever of the lever linkage.

52. A fuse as claimed in claim 51, wherein the retaining wire is secured to the lever by one of a partial turn, at least one round turn, a loop, and an eyelet.

\* \* \* \* \*

UNITED STATES PATENT AND TRADEMARK OFFICE

CERTIFICATE OF CORRECTION

PATENT NO.    : 5,880,664
DATED         : March 9, 1999
INVENTOR(S)   : Fritz Hollmann, et al It is certified that error appears in the above-identified patent and that said Letters Patent is hereby corrected as shown below:

One the title page:

[75]   Inventors: Fritz Hollmann, Wegberg, Martin Grote, Erkelenz, Ilona Kluth, Grevenbroich, all of Germany

[73]   Assignee: Fritz Driescher KG Spezialfabrik für Elektrizitätswerksbedarf GmbH & Co., Wegberg, Germany Signed and Sealed this Twenty-seventh Day of July, 1999

Attest:

Q. TODD DICKINSON

Attesting Officer       Acting Commissioner of Patents and Trademarks